Figure 1:
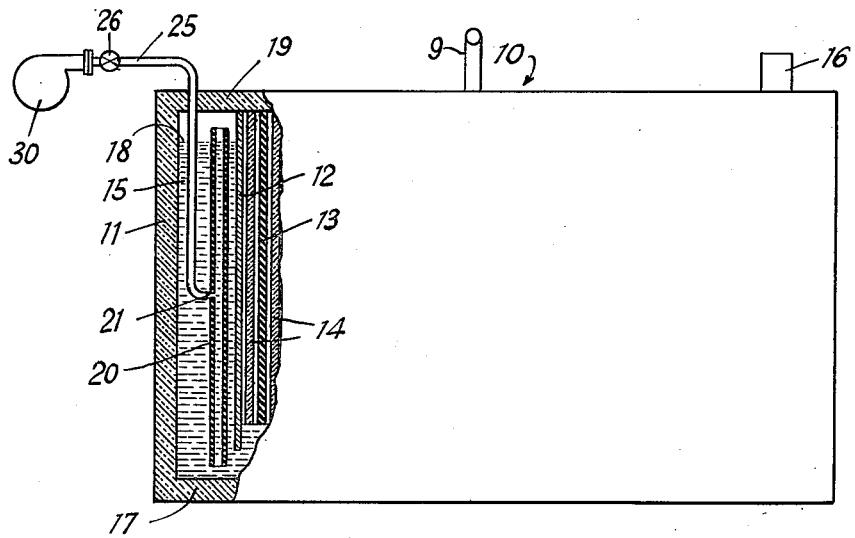

Feb. 5, 1952  H. G. ELROD, JR  2,584,117
CIRCULATION OF CELL ELECTROLYTE
Filed Dec. 28, 1949

INVENTOR
*Harold G. Elrod, Jr.*
BY
*J. P. Moran*
ATTORNEY

Patented Feb. 5, 1952

2,584,117

UNITED STATES PATENT OFFICE 2,584,117

CIRCULATION OF CELL ELECTROLYTE

Harold G. Elrod, Jr., Alliance, Ohio, assignor to The Babcock & Wilcox Company, Jersey City, N. J., a corporation of New Jersey Application December 28, 1949, Serial No. 135,495

10 Claims. (Cl. 136—159)

This invention relates to cells comprising electrodes disposed in an electrolyte contained in a suitable vessel and connected in an external electric circuit. More particularly, the invention is directed to improved means for maintaining a substantially uniform density of the electrolyte throughout its volume.

In such cells, when the external circuit is closed resulting in a flow of electric current through the electrolyte between the electrodes, there is a change in the density of the electrolyte. The more highly concentrated electrolyte settles toward the bottom of the cell with the dilute electrolyte in the upper portion of the electrolyte body, resulting in substantial stratification of the electrolyte in accordance with the density gradient.

This phenomenon is particularly pronounced during charging of secondary cells of the type used, for example, in storage batteries. In the latter case, the electrolyte stratification seriously restricts the rate of charging the cell and effectively limits the ultimate charge which can be developed.

Recognizing the serious nature of this problem, many proposals have been made for assuring uniform density of the electrolyte throughout its volume. These proposed solutions have involved motor driven paddles or fans for circulating the electrolyte, pumps for withdrawing electrolyte at the lower cell levels and returning it to the upper cell levels, special electrode constructions associated with mechanical electrolyte circulation means, arrangements for forcing large volumes of air under relatively high pressures through the electrolyte, and electrolyte spray heads, among others.

Some of these arrangements have been functionally effective in securing sufficient circulation of the electrolyte to assure a substantially uniform density thereof. However, all of these solutions suffer from the serious disadvantages of requiring relatively excessive power for operation, substantial modification of the cell construction, and expensive installation expense. Additionally, the prior art arrangements are bulky and complicated, resulting in an inefficient use of available space and heavy maintenance expenses. None of them can be used with the usual complement of storage battery auxiliaries.

These considerations become of even greater importance in the case of storage batteries used in confined spaces, such as submarines, for example, where the space for batteries and other equipment is limited and all available space must be efficiently utilized. The compact construction of submarines likewise leaves little excess power available for auxiliaries additional to the normal complement. These considerations effectively rule out mechanically operated electrolyte circulators for use on submarines. However, due to the necessity for maintaining the batteries as fully charged as possible, for underwater propulsion, it is highly desirable to provide some means for circulating the electrolyte or otherwise assuming a uniform density thereof.

To this end, attempts have been made to use the battery room ventilation air supply to operate an electrolyte circulator. While the air supply to the battery room is under several inches of pressure, the arrangements hitherto proposed have not been able to obtain the required electrolyte circulation rate with the power available from the air supply. For example, the ventilation system for the battery room may provide three (3) cu. ft. of air per minute at a pressure of eight inches (8") in the ventilating main. The electrolyte may have an average density of about 1.4 and need to be lifted about thirty-three inches (33") to bring the heavier electrolyte from the bottom of the cell to the surface. The required circulation to achieve effective results is about ten (10) gallons per hour with a battery containing around 21 gallons of electrolyte. Additionally the circulator must be highly compact due to space limitations within the battery cells. It has heretofore not been possible to reconcile all of these factors and obtain the required circulation rate.

The present invention relates to a compact and simple electrolyte circulator which is effective to obtain the required circulation rate within the limits of available air space, and which can be installed within the available space in the cell or which can be incorporated in the battery case. To this end, the invention comprises the establishment of a small cross-sectional area, vertically extending, laterally confined zone of electrolyte within the main body of the electrode, the zone extending to the surface of the electrolyte and communicating at its lower end with the lower strata of electrolyte. At least the upper portion of the confined electrolyte is aerated under a positive pressure to decrease its average density relative to that of the surrounding body of electrolyte to thus effect circulation of electrolyte from the lower strata thereof through the confined zone to the surface of the electrolyte.

The air is introduced into the confined zone at a point some distance below the surface of the electrolyte. This distance is so selected that the head due to the nonaerated electrolyte above the air introduction point is slightly less than that corresponding to the air pressure available at the introduction point. The resulting pressure differential effects air flow into and upwardly through the confined zone of electrolyte above the air entry point. As the electrolyte in this upper portion of the zone becomes aerated, there is a decrease in the average density of the electrolyte throughout the confined zone, relative to the average density of the body of electrolyte surrounding the zone. Consequently, there is an upward flow of electrolyte through the confined zone, the lighter electrolyte returning to the main body from the upper end of the zone and the heavier electrolyte entering the zone at its lower end.

The air pressure may be a superatmospheric head from the pressure in the battery room ventilating system or may be due to the negative pressure within the cell created by the cell venting system.

The invention apparatus for effecting the circulation includes a small diameter open ended tube disposed vertically in the cell with its lower end adjacent the cell bottom and its upper end extending above the electrolyte surface. At a point below the electrolyte surface, the tube is formed with an aperture or orifice in its wall which, through the medium of a suitable nipple and a preferably flexible air tube, may be connected to the ventilating air supply. The orifice acts as a flow control means and dissipates the pressure of the air entering the tube and limits its rate of flow into the tube. The tube is preferably of hard rubber or other suitable electrolyte resistant material.

Alternatively, the confined electrolyte zone may be provided by drilling a vertical bore in one wall of the battery casing, closing the end of the bore with a suitable plug and drilling cross passages into the bore near the bottom of the casing and just above the electrolyte surface. The passages are drilled through the inner surface of the casing wall. A suitable nipple is inserted through the outer surface of the casing wall, below the electrolyte surface level, for attachment to an air hose to supply air, as from the ventilating air supply to the interior of the vertical bore.

It should be understood that, while air is referred to as the medium for decreasing the electrolyte density, any suitable light gas other than air may be used within the scope of the invention.

With the foregoing in mind, it is an object of the present invention to provide a new and improved method of circulating electrolyte in a cell containing electrolyte and electrodes disposed therein.

Another object is to provide an electrolyte circulator which is compact in construction, efficient in operation and economical in power consumption.

These and other objects, advantages and novel features of the invention, will be apparent from the following description and the accompanying drawings.

Figure 2:
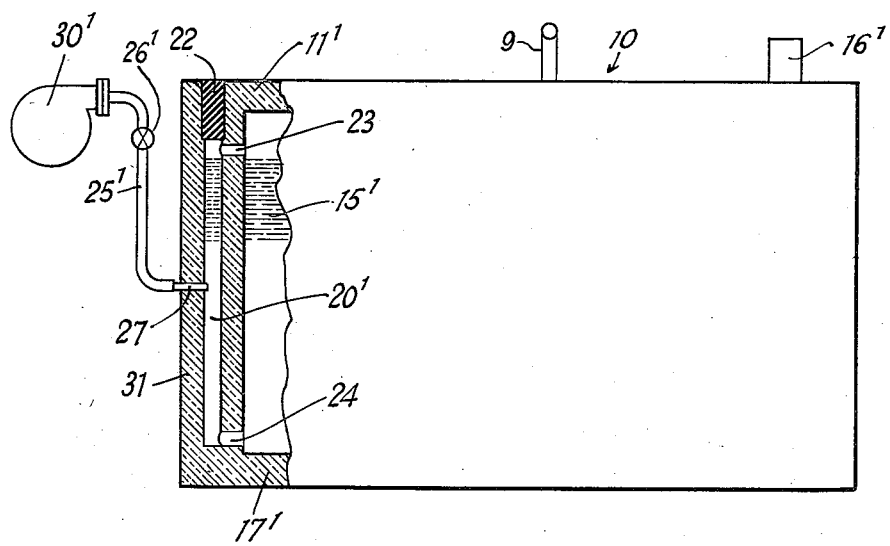

In the drawings:

Fig. 1 is an elevational view partly in section of a storage battery cell having the invention electrolyte circulator incorporated therein; and Fig. 2 is a partial vertical sectional view of a storage battery cell casing embodying an alternative form of the invention.

Referring first to Fig. 1, the invention is illustrated as incorporated, by way of example, in a storage battery cell 10 comprising a casing 11 of hard rubber or the like arranged to contain an electrolyte 15. In accordance with the usual construction, battery cell 10 may include positive and negative electrodes such as 12 and 13 which are spaced apart, in the usual manner, by separators 14. The means for supporting and spacing electrodes 12 and 13 and the specific construction thereof, form no part of the present invention and therefore have not been illustrated in detail. It should be understood that the battery cell may be of any construction and may represent a lead acid type of storage battery or a so-called "Edison" storage battery cell. One terminal 16 of the cell is indicated for connection to a suitable external circuit through which the cell may deliver electric current or by means of which a charging current may be applied to the cell. In accordance with the usual practice, suitable circulating space for the electrolyte 15 is provided around and between the electrodes 12 and 13, and the electrolyte may, if desired, completely submerge the active surfaces of the electrodes, its surface level being above that of the upper edges of the electrodes. The cell may be vented by suitable means indicated at 9 for either natural draft or connection to an exhaust fan.

As stated above, particularly during charging of the cell, electrolyte 15 tends to stratify into layers of differing densities, the more concentrated electrolyte collecting at the bottom of the cell and the more diluted electrolyte rising to the surface of the electrolyte top. This stratification seriously interferes with the charging rate of the cell and also of the ultimate charge which may be applied to the electrodes 12 and 13.

In accordance with the present invention, a circulation of the electrolyte to establish a substantially uniform density thereof is effected by laterally confining a vertically extending zone of the electrolyte and aerating the electrolyte in at least the upper portion of this zone to create a difference in the average density of the electrolyte within the zone relative to the average density of the surrounding electrolyte tube so that a circulation of electrolyte upwardly through the confined zone is effected. In the arrangement of Fig. 1 this circulation is provided by vertically extending open-ended, small diameter tube 20 of hard rubber or other suitable electrolyte resistant material. Tube 20 has a length and is so arranged that it extends from a point near the bottom wall 17 of casing 11 to a point above the upper surface 18 of the electrolyte 15, thereby laterally confining a vertically extending zone of the electrolyte. Below the electrolyte surface, tube 20 is provided with a lateral orifice 21, which may have a suitable nipple inserted therein for attachment to an air hose or air tube 25. The air tube extends through the upper wall 19 of casing 11 and is schematically indicated as connected to a blower 30. The latter may comprise the source of ventilating air for the battery room. Alternatively, the venting system may be used to create the required air head, and the vented air could, if desired, be recirculated to the supply system. A valve 26 may be provided to control air flow through line 25.

When an air head is applied, either from the ventilating main or due to suction through vent 9, and is greater than the electrolyte head above orifice 21, the electrolyte above the orifice is aerated by flow through the orifice into the electrolyte thereabove. The electrolyte within tube 20 then attains an average density substantially less than that of the body of electrolyte surrounding tube 20. Consequently, due to this density differential, the electrolyte flows upwardly through tube 20 from the bottom of cell 10 and is discharged from the upper end of tube 20 onto the surface 18 of electrolyte 15 where it circulates around the electrodes and mixes with the main body of electrolyte. This "percolator effect" thus provides a circulation of the electrolyte through the tube 20 so that the higher density electrolyte near the bottom of the cell is thoroughly mixed with the more diluted electrolyte near the top of the cell so that a substantially uniform electrolyte density is obtained.

In a typical example, tube 20 may have an internal diameter of $\frac{5}{16}''$, and the air may be supplied through a tube 25 having an internal diameter of $\frac{1}{8}''$ and enter tube 20 through an 0.07'' diameter orifice 21 3½ inches below the surface 18 of electrolyte 15. With $\frac{1}{20}$ cu. ft. of air per minute available, at a head of about 4 inches under normal operating conditions, the described arrangement is effective to secure an electrolyte circulation of at least 4 gallons per hour, the average density of the electrolyte being about 1.4. Thus the arrangement is compact enough for use within the limited space available in a storage battery cell while being effective to attain desired circulation rate within the available power supply from the system.

Fig. 2 shows an alternative construction in which the electrolyte circulator is integrally incorporated with the storage battery cell. In this construction, the wall 31 of cell 10' is formed with a vertical bore 20' extending from the top of the cell to a point just short of the bottom wall 17' of the casing 11'. The open upper end of bore 20' is closed by a suitable plug 22 of hard rubber or other electrolyte resistant material. Upper and lower horizontal bores 23 and 24, respectively, are drilled through the inner surface of wall 21 into tube 20' at points just above the electrolyte level and at the bottom end of bore 20'. A hard rubber nipple 27 is inserted through a suitable opening in the outer surface of wall 31 to establish communication between bore 20' and air tube 25' schematically indicated as supplied with air from blower 30'. This embodiment of the invention operates in the same manner as does that of Fig. 1, the difference being that the circulator is integrally incorporated into a wall of the casing 11' of the storage battery cell 10.

While the circulator has been illustrated by way of example as applied to a storage battery cell, the invention is equally applicable wherever a low outer high capacity circulation of electrolyte or similar fluid is required. For example, the circulator may be used with an electroplating cell or with other types of electrolytic devices. Also, as previously stated the circulating medium may be a light gas other than air. For example, helium, hydrogen, or the like are suitable.

In the arrangement of Fig. 1, the draft tube 20 can be rigidly supported in casing 10 or may be secured to a float riding on the upper surface of the electrolyte. In both embodiments of the invention, additional draft tubes may be used if greater circulation rates are desired.

While specific embodiments of the invention have been shown and described in detail to illustrate the application of the invention principles, it should be understood that the invention may be otherwise embodied without departing from such principles.

I claim:

1. In a cell comprising a vessel containing a body of electrolyte of the type tending to settle in vertically superposed layers of differing densities, and electrodes disposed in the electrolyte, the method of circulating the electrolyte to establish a substantially uniform density thereof comprising establishing a vertically extending laterally confined zone of electrolyte, the zone extending to the surface of the electrolyte and communicating at its lower end with the lower strata of electrolyte; and applying a gas to electrolyte in at least the upper portion of such zone at a pressure just sufficiently greater than the electrolyte head at the point of gas introduction to assure flow of gas into the confined electrolyte to aerate the latter to decrease the average density of the confined electrolyte relative to the average density of the main body of electrolyte to effect circulation of electrolyte from the lower strata thereof through such zone to the surface of the body of electrolyte.

2. In a cell comprising a vessel containing a body of electrolyte of the type tending to settle in vertically superposed layers of differing densities, and electrodes disposed in the electrolyte, means for circulating the electrolyte to establish a substantially uniform density thereof comprising means establishing a vertically extending, laterally confined zone of electrolyte, the zone extending to the surface of the electrolyte and communicating at its lower end with the lower strata of electrolyte; and gas supply means in communication with such zone at a pressure just sufficiently greater than the electrolyte head at the point of gas introduction to assure flow of gas into the confined electrolyte and effecting circulation of electrolyte from the lower strata thereof through such zone to the surface of the body of electrolyte.

3. In a cell comprising a vessel containing a body of electrolyte of the type tending to settle in vertically superposed layers of differing densities, and electrodes disposed in the electrolyte, means for circulating the electrolyte to establish a substantially uniform density thereof comprising means establishing a vertically extending, laterally confined zone of electrolyte within and substantially surrounded by the body of electrolyte, the zone extending to the surface of the electrolyte and communicating at its lower end with the lower strata of electrolyte; and gas supply means in communication with such zone at a pressure just sufficiently greater than the electrolyte head at the point of gas introduction to assure flow of gas into the confined electrolyte to aerate zone confined electrolyte to decrease the average density of the confined electrolyte relative to the average density of the surrounding body of electrolyte to effect circulation of electrolyte from the lower strata thereof through such zone to the surface of the body of electrolyte.

4. In a cell comprising a vessel containing a body of electrolyte of the type tending to settle in vertically superposed layers of differing densities, and electrodes disposed in the electrolyte, means for circulating the electrolyte to establish a substantially uniform density thereof comprising an open ended tube disposed vertically in the cell and having its lower end adjacent the bottom of the cell and its upper end above the surface of the electrolyte; a source of gas; means connecting said source to said tube; means creating a gas head just sufficiently greater than the electrolyte head at the point of connection of said means to said tube to effect flow of gas into said tube to aerate electrolyte confined within said tube to decrease the average density of the confined electrolyte relative to the average density of the surrounding body of electrolyte to effect circulation of electrolyte from the lower strata thereof through said tube to the surface of the body of electrolyte.

5. In a cell comprising a vessel containing a body of electrolyte of the type tending to settle in vertically superposed layers of differing densities, and electrodes disposed in the electrolyte, means for circulating the electrolyte to establish a substantially uniform density thereof comprising an open ended tube disposed vertically in the cell and having its lower end adjacent the bottom of the cell and its upper end above the surface of the electrolyte; a source of gas; means connecting said source to said tube below the electrolyte surface; means creating a gas head just sufficiently greater than the electrolyte head at the point of connection of said means to said tube to effect flow of gas into said tube to aerate electrolyte confined within said tube to decrease the average density of the confined electrolyte relative to the average density of the surrounding body of electrolyte to effect circulation of electrolyte from the lower strata thereof through said tube to the surface of the body of electrolyte.

6. In a cell comprising a vessel containing a body of electrolyte of the type tending to settle in vertically superposed layers of differing densities, and electrodes disposed in the electrolyte, means for circulating the electrolyte to establish a substantially uniform density thereof comprising an open ended tube disposed vertically in the cell and having its lower end adjacent the bottom of the cell and its upper end above the surface of the electrolyte; said tube having an orifice opening in its side wall for connection to a source of gas to aerate electrolyte confined within said tube to decrease the average density of the confined electrolyte relative to the average density of the surrounding body of electrolyte to effect circulation of electrolyte from the lower strata therof through said tube to the surface of the body of electrolyte.

7. In a cell comprising a vessel containing a body of electrolyte of the type tending to settle in vertically superposed layers of differing densities, and electrodes disposed in the electrolyte, means for circulating the electrolyte to establish a substantially uniform density thereof comprising an open ended tube disposed vertically in the cell and having its lower end adjacent the bottom of the cell and its upper end above the surface of the electrolyte; said tube having an orifice opening in its side wall beneath the surface of the electrolyte for connection to a source of gas to aerate electrolyte confined within said tube to decrease the average density of the confined electrolyte relative to the average density of the surrounding body of electrolyte to effect circulation of electrolyte from the lower strata thereof through said tube to the surface of the body of electrolyte.

8. In a cell comprising a vessel containing a body of electrolye of the type tending to settle in vertically superposed layers of differing densities, and electrodes disposed in the electrolyte, means for circulating the electrolyte to establish a substantially uniform density thereof comprising an open ended relatively small diameter tube disposed vertically in the cell and having its lower end adjacent the bottom of the cell and its upper end above the surface of the electrolyte; said tube having an orifice opening in its side wall beneath the electrolyte surface for connection to a source of gas to aerate electrolyte confined within said tube to decrease the average density of the confined electrolyte relative to the average density of the surrounding body of electrolyte to effect circulation of electrolyte from the lower strata therof through said tube to the surface of the body of electrolyte.

9. In a cell comprising a vessel containing a body of electrolyte of the type tending to settle in vertically superposed layers of differing densities, and electrodes disposed in the electrolyte, means for circulating the electrolyte to establish a substantially uniform density thereof comprising an open ended passage extending vertically through a wall of the cell and having its lower end communicating with the body of electrolyte adjacent the bottom of the cell and its upper end opening above the surface of the electrolyte; a source of gas; means connecting said source to said passage; means creating a gas head just sufficiently greater than the electrolyte head at the point of connection of said means to said passage to effect flow of gas into said passage to aerate electrolyte confined within said passage to decrease the average density of the confined electrolyte relative to the average density of the surrounding body of electrolyte to effect circulation of electrolyte from the lower strata thereof through said passage to the surface of the body of electrolyte.

10. In a cell comprising a vessel containing a body of electrolyte of the type tending to settle in vertically superposed layers of differing densities, and electrodes disposed in the electrolyte, the method of circulating the electrolyte to establish a substantially uniform density thereof comprising establishing a vertically extending laterally confined zone of electrolyte within and substantially surrounded by the body of electrolyte, the zone extending to the surface of the electrolyte and communicating at its lower end with the lower strata of electrolyte; and applying a gas to electrolyte in at least the upper portion of such zone at a pressure just sufficiently greater than the electrolyte head at the point of gas introduction to assure flow of gas into the confined electrolyte to aerate the latter to decrease the average density of the confined electrolyte relative to the average density of the surrounding body of electrolyte to effect circulation of electrolyte from the lower strata thereof through such zone to the surface of the body of electrolyte.

HAROLD G. ELROD, JR.

REFERENCES CITED

The following references are of record in the file of this patent:

UNITED STATES PATENTS

| Number | Name | Date |
|---|---|---|
| 759,065 | Betts | May 3, 1904 |
| 898,055 | MacMillan | Sept. 8, 1908 |
| 931,929 | Joel | Aug. 24, 1909 |
| 1,236,673 | Chamberlain | Aug. 14, 1917 |
| 1,376,257 | Cook | Apr. 26, 1921 |
| 2,379,374 | Payne | June 26, 1945 |